United States Patent Office 2,796,377
Patented June 18, 1957

2,796,377

FUNGICIDAL COMPOSITIONS AND METHOD OF USING SAME

Mario Scalera and Tsai H. Chao, Somerville, N. J., assignors to American Cyanamid Company, New York, N. Y., a corporation of Maine No Drawing. Application October 26, 1955, Serial No. 543,022

10 Claims. (Cl. 167—32)

This invention relates to improved fungicidal compositions. More particularly, it relates to fungicidal composition comprising substituted naphthoquinone derivatives. Specifically, the invention is concerned with fungicidal compositions comprising as an active ingredient a dithiocyano-substituted 1,4-naphthoquinone represented by the general formula:

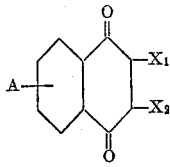

where $X_1$ and $X_2$ are each thiocyano or thiocyanomethyl radicals and A is hydrogen or a nitro group. Still more specifically, the invention relates to methods of protecting agricultural, organic and related articles from attack by micro-organisms.

It has been found that certain compounded mixtures containing naphthoquinones of the structure above possess unusual fungicidal properties. These substituted naphthoquinone containing compositions are particularly effective in preventing and retarding fungus growth on seeds, soils, plants, fruits, fur, leather, cotton, wood and other organic matter.

In general, the substituted naphthoquinone ingredient of the compositions of this invention can be easily synthesized. For example, approximately one mole of an appropriate 2,3-dihalo naphthoquinone reacts with two moles of a water soluble salt of thiocyanic acid. Illustrative salts include sodium thiocyanate, potassium thiocyanate, lithium thiocyanate, ammonium thiocyanate and the like. Preferably, the reaction is conducted under the reflux conditions and in the presence of an inert non-hydroxylated organic solvent, such as acetone, ethyl ether, ethyl acetate, or the like.

To facilitate a complete understanding of the invention and particularly how the active fungicidal compound is prepared, the following examples are given for the purpose of illustrating certain more specific details. Unless otherwise noted, all parts are by weight.

EXAMPLE 1

2,3-dithiocyano-1,4-naphthoquinone

To 60 parts of acetone are added 4.5 parts of 2,3-dichloro-1,4-naphthoquinone and 4.5 parts of potassium thiocyanate. The mixture is then heated at the reflux temperature for two and one-half hours to complete the reaction. It is then filtered and the filter cake is dried in the air. Solid product is slurried in water and removed by filtration and dried. A good yield of 2,3-dithiocyano-1,4-naphthoquinone having a melting point of 235° C.–240° C. is obtained, analyzing as follows.

Calc'd for $C_{12}H_4S_2N_2O_2 \cdot \frac{1}{2}H_2O$: C, 51.2; H, 1.8; O, 13.9; N, 10.0; S, 22.8. Found: C, 50.4; H, 1.7; O, 14.3; N, 10.3; S, 23.1.

EXAMPLE 2

2,3-bis (thiocyanomethyl)-1,4-naphthoquinone

To 120 parts of acetone are added 7.8 parts of 2,3-bis (chloromethyl)-1,4-naphthoquinone and 5.7 parts of potassium thiocyanate. The mixture is heated at the reflux temperature for two hours until the reaction is complete. When the mixture cools to room temperature, potassium chloride precipitates. This precipitate is removed by filtration and the acetone filtrate is drowned in 300 parts of water. The solid product which separates is removed by filtration and washed with water and dried. A good yield of 2,3-bis (thiocyanomethyl)-1,4-naphthoquinone is obtained. The melting point of the latter compound after recrystallization from alcohol-acetone is found to be 179° C.–180° C., analyzing as follows.

Calc'd for $C_{14}H_8S_2N_2O_2$: C, 56.1; H, 2.6; S, 21.3; N, 9.51. Found: C, 56.1; H, 2.66; S, 21.2; N, 9.34.

EXAMPLE 3

2,3-bis (thiocyano)-5-nitro-1,4-naphthoquinone 13.6 parts of 2,3-dichloro-5-nitro-1,4-naphthoquinone and 10.5 parts of potassium thiocyanate are added to 120 parts of acetone. The mixture is heated under reflux conditions for one and a half hours until the reaction is complete. Resultant reaction mixture is then cooled. Precipitated 2,3-bis (thiocyano)-5-nitro-1,4-naphthoquinone product is removed by filtration, washed with water and dried. 15 parts of product which has a melting point in excess of 270° C. is obtained. This represents a yield of approximately 97% based on the weight of 2,3-dichloro-5-nitro-1,4-naphthoquinone. The analysis on a sample recrystallized from alcohol is as follows.

Calc'd for $C_{12}H_3N_3S_2O_4 \cdot H_2O$: C, 43.0; H, 1.5; N, 12.6; S, 19.2. Found: C, 42.3; H, 1.5; N, 13.3; S, 19.4.

It is an advantage of the present invention that the fungicidal compounds are effective in extremely dilute concentrations. It is preferred, therefore, to incorporate the substituted naphthoquinones in a variety of suitable carriers or diluents. Such compositions can be prepared either as a suspension in a suitable non-solvent or as a dust. A suspension or dispersion of the substituted naphthoquinones in a non-solvent therefor, such as water, is advantageously prepared for plant foliage treatment.

For the protection of fruits, seeds, plant tubers and the like during storage, it is advantageous to treat the latter by employing an aqueous emulsion of the naphthoquinone fungicide. An emulsion may be formed by dissolving the fungicide in an oil and the solution emulsified in water. The oil which can be used as a solvent for the naphthoquinones of the present invention is a hydrocarbon, as for example benzene or toluene or a halogenated hydrocarbon, such as chlorobenzene, chloroform, fluorotrichloromethane or dichlorodifluoromethane.

The compounds of the present invention may further be applied to plant foliage by the aerosol method. Solutions for the aerosol treatment are prepared either by dissolving the appropriate naphthoquinone directly in a highly volatile liquid carrier, such as trichloromethane, or by dissolving the substituted naphthoquinone in a lesser volatile solvent as for example, benzene, and then mixing such solution with the highly volatile liquid aerosol carrier.

Fungicidal dust may also be prepared by mixing the instant substituted naphthoquinones with dusting materials as for example, clay, pyrophyllite, bentonite, pumice, fuller's earth and the like. Accordingly, seeds can be protected from soil organisms harmful to them by incorporating the present compounds with a solid carrier and mixing the composition with the seed as by tumbling.

The range weightwise of inert carrier or diluent to fungicidal compound is broad and not critical. It has been found that up to about 10% by weight of the compound based upon the weight of the inert carrier is generally quite adequate. In most cases, however, from about 0.01% to 1% of active ingredient and preferably about 0.15% is adequate for aqueous dispersion preparation. As for dust compositions, about 5% of active ingredient is more than satisfactory for most applications.

When the fungicidal compounds are employed in aqueous suspensions, the compositions may advantageously contain dispersing agents for the fungicidal compounds. Examples of such dispersing or surface active agents that can be utilized in forming dispersions include: the fatty acid esters of polyhydric alcohols (for example, Span), the sodium salt of a polymerized propyl naphthalene sulfonic acid (DAXAD 11) and formed by condensing formaldehyde with propyl naphthalene sodium sulfonate, the alkylarypolyether alcohols (such as Triton X–100), the ethylene oxide addition products of such esters as for example, "Tween" and the like. Usually, a good practice is to add from one (1) to about five (5) parts of dispersing agent per 100 parts of fungicide compound.

The invention is further illustrated by the following examples; but it is not to be construed as limited thereto.

EXAMPLE 4

The toxic agents of the present invention were tested in this example for fungicidal action on spores of *Sclerotinia fructigena* and *Macrosporium sarcinaeforme*, which are both fungae and parasitic on stone fruits and clover, respectively.

These organisms were easily cultured on potato dextrose agar slants and their spores were readily visible under low-power magnification. Spores were obtained in abundance from 7-day old cultures of *Macrosporium sarcinaeforme* and 14-day old cultures of *Sclerotinia fructigena*. The spores are washed from the agar slant with distilled water and are adjusted to a concentration of approximately 50,000 spores per cc. of water. Representative naphthoquinone derivatives were dispersed in water in various concentrations given in the table below. Aliquots of this dispersion were then placed in separate vials with a definite concentration of spores (50,000 spores per cc. of water). In runs 1 and 2 of Table I below, a surface active agent was not added to the mixture. However, in run 3, one (1) part of DAXAD 11 is added to 100 parts of fungicide and mixed prior to dispersing the latter mixture in water. The suspension of spores in toxic agent was then kept mixed in a tumbling machine for a period of 24 hours. At the end of this time, the spores were examined under a microscope for germination. The results of these tests appear in the following table:

TABLE I

| Run No. | Compound | Percent Kill | | | | |
|---|---|---|---|---|---|---|
| | | *Sclerotinia fructigena*, Percent conc. | | | *Macrosporium sarcinaeforme*, Percent conc. | |
| | | 0.01 | 0.001 | 0.0001 | 0.001 | 0.0001 |
| | 1,4-Naphthoquinone | | | | | |
| 1 | 2,3-bis(thiocyanomethyl)- | | | 95 | 95 | 50 |
| 2 | 2,3-bis(thiocyano)-5-nitro- | 95 | | | 95 | |
| 3 | 2,3-dithiocyano- | | 95 | 50 | 95 | |

EXAMPLE 5

About 24 hours before treatment with an aqueous dispersion of 2,3 - bis (thiocyanomethyl) - 1,4 - naphthoquinone, apple tree foliage is inoculated with spores of *Venturia inaequalis*, the fungus which causes a disease known as apple scab. After the 24 hours infection period, an aqueous dispersion of the latter substituted naphthoquinone derivative (prepared by dispersing one-half part the naphthoquinone in 800 parts of water), is sprayed on infected apple tree foliage. It is observed that the treatment with the above-mentioned thiocyanomethyl naphthoquinone derivative is effective in the eradication of the fungus.

EXAMPLE 6

The procedure of Example 5 is repeated except that the fungicidal composition comprises one part of 2,3-bis (thiocyano) - 5 - nitro - 1,4 - naphthoquinone to 800 parts of water. In order to obtain rapid dispersion of the naphthoquinone compound, 0.01 part of "DAXAD" is admixed with the latter. The treatment eradicated the fungus which indicates the effectiveness of the dicyano-5-nitro-naphthoquinone derivative as a fungicide.

While the fungicidal composition of the present invention can be used either in a powder or in other inert carriers, a multi-purpose composition may be prepared by adding other active ingredients thereto. Such other active ingredients can be used as the carrier per se. Additionally, an inert carrier may also be present. These active ingredients in admixture can be herbicides, insecticides, fertilizers and the like. Thus, for example, an effective dose of naphthoquinone toxic agent of the present invention and an insecticide such as parathion or DDT suspended in water in the presence of a dispersing agent can be employed as a multi-purpose fungicidal preparation.

The term fungicide as used in this specification and claims is meant to include not only a material having the property of destroying fungi, but also the property of inhibiting the germination of spores of the fungi. It is an advantage of the invention that the compositions of the present invention are commercially suitable for this purpose.

We claim:

1. A fungicidal composition comprising an inert carrier and a minor but effective amount of a 2,3-bis (thiocyano)-1,4-naphthoquinone represented by the formula:

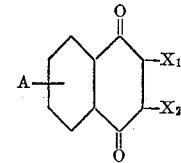

wherein $X_1$ and $X_2$ are selected from the group consisting of thiocyano and thiocyanomethyl radicals and A is selected from the group consisting of hydrogen and a nitro radical.

2. A fungicidal composition according to claim 1 wherein the naphthoquinone is suspended in water and in the presence of a surface active agent.

3. A fungicidal composition according to claim 1 in which the naphthoquinone is 2,3-bis (thiocyanomethyl)-1,4-naphthoquinone.

4. A fungicidal composition according to claim 1 in which the naphthoquinone is 2,3-bis (thiocyano)-5-nitro-1,4-naphthoquinone.

5. A fungicidal composition according to claim 1 in which the naphthoquinone is 2,3-dithiocyano-1,4-naphthoquinone.

6. The method of protecting organic materials susceptible to attack by fungi which comprises applying to said organic material a fungicidal composition comprising an inert carrier and a minor amount of a 2,3-bis (thiocyano)-1,4-naphthoquinone, said 1,4-naphthoquinone being represented by the formula:

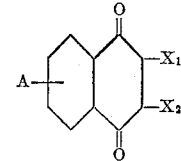

wherein $X_1$ and $X_2$ are selected from the group consisting of thiocyano and thiocyanomethyl radicals and A is selected from the group consisting of hydrogen and a nitro radical.

7. The method according to claim 6 in which the fungicidal composition comprises a suspension of a 2,3-bis(thiocyano)-1,4-naphthoquinone in water and in the presence of a surface active agent, said 1,4-naphthoquinone being represented by the formula:

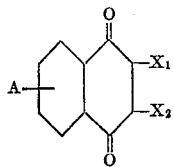

wherein $X_1$ and $X_2$ are selected from the group consisting of thiocyano and thiocyanomethyl radicals and A is selected from the group consisting of hydrogen and a nitro radical.

8. The method according to claim 6 in which the 1,4-naphthoquinone is 2,3-bis(thiocyanomethyl)-1,4-naphthoquinone.

9. The method according to claim 6 in which the naphthoquinone is 2,3-bis(thiocyano)-5-nitro-1,4-naphthoquinone.

10. The method according to claim 6 in which the naphthoquinone is 2,3-dithiocyano-1,4-naphthoquinone.

No references cited.